United States Patent [19]

May

[11] 4,020,546
[45] May 3, 1977

[54] METHOD FOR MAKING A CABLE SPLICE JOINING A PAIR OF FLEXIBLE CONDUCTING CABLES

[75] Inventor: Francis A. May, Pittsburgh, Pa.

[73] Assignee: Consolidation Coal Company, Pittsburgh, Pa.

[22] Filed: May 26, 1976

[21] Appl. No.: 690,363

Related U.S. Application Data

[60] Division of Ser. No. 562,228, March 26, 1975, Pat. No. 3,980,806, which is a continuation-in-part of Ser. No. 179,445, Sept. 10, 1971, abandoned.

[52] U.S. Cl. .............................. 29/628; 29/630 F
[51] Int. Cl.² ..................................... H01R 43/04
[58] Field of Search ............. 29/628, 630 R, 630 A, 29/630 F, 517, 518; 174/84 R, 84 C, 88 R, 94 R, 90; 339/276 R, 276 T, 276 C; 16/108, 109; 140/111; 403/278, 281, 285, 291

[56] References Cited

UNITED STATES PATENTS

| | | |
|---|---|---|
| 1,727,895 | 9/1929 | Mraz ............................ 339/276 R |
| 2,576,528 | 11/1951 | Matthysse ........................ 174/94 R |
| 2,659,795 | 11/1953 | Boggs ......................... 174/84 C X |
| 2,959,436 | 11/1960 | Duda ............................... 174/90 X |
| 3,496,284 | 2/1970 | Astrove ...................... 174/84 C X |
| 3,781,458 | 12/1973 | May ................................ 174/84 C |
| 3,871,932 | 3/1975 | Langenberg ................ 174/84 C X |

FOREIGN PATENTS OR APPLICATIONS

| | | |
|---|---|---|
| 660,415 | 4/1963 | Canada |
| 770,773 | 10/1967 | Canada |

*Primary Examiner*—James R. Duzan
*Attorney, Agent, or Firm*—William A. Mikesell, Jr.; Stanley J. Price, Jr.; John M. Adams

[57] ABSTRACT

A cylindrical metallic sleeve has opposite end portions and a cylindrical body portion with a longitudinal passageway for receiving the end portions of a conducting cable in overlapping relation. A shaped annular portion is formed adjacent the sleeve end portions and includes an inner, outwardly flared cylindrical surface and an outer cylindrical surface that intersect in a rounded end portion. The outer cylindrical surface is planar and positioned substantially parallel to the sleeve cylindrical body portion so that the insulation surrounding the cables adjacent the sleeve end portions is not abraded upon flexing the spliced cable. The flared inner surface is removed from contact with the overlapping cable end portions in the sleeve to permit flexing of the cable end portions therein without abrading the cables. The sleeve body is crimped into frictional engagement with the overlapped cable end portions. The exposed portions of the spliced conductor cable are enclosed with insulating materials to provide a flexible, insulated cable splice that may be wound around a cable reel and/or guide sheaves.

8 Claims, 11 Drawing Figures

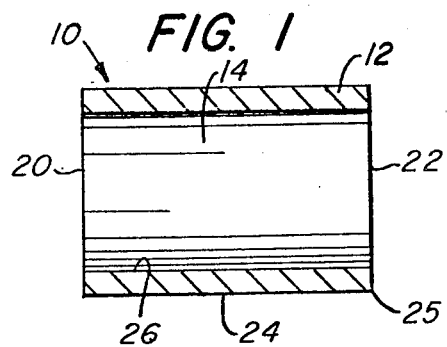
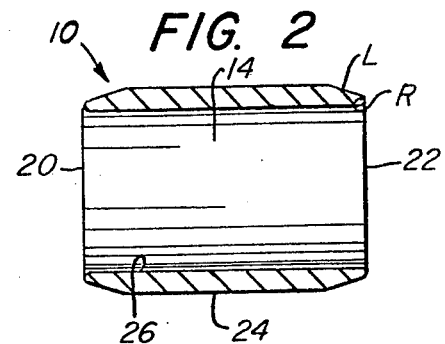
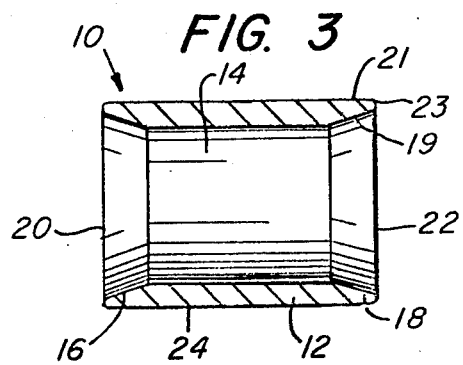
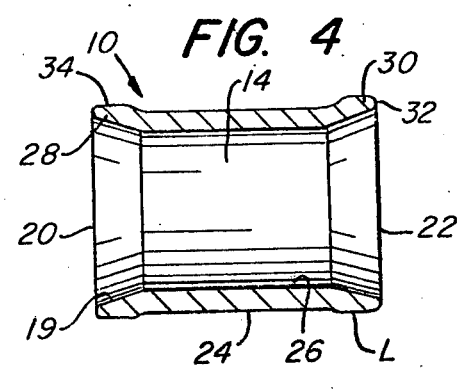
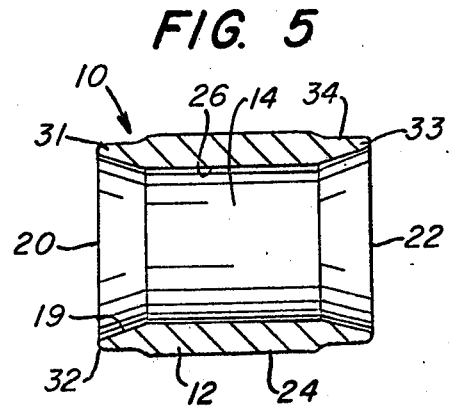
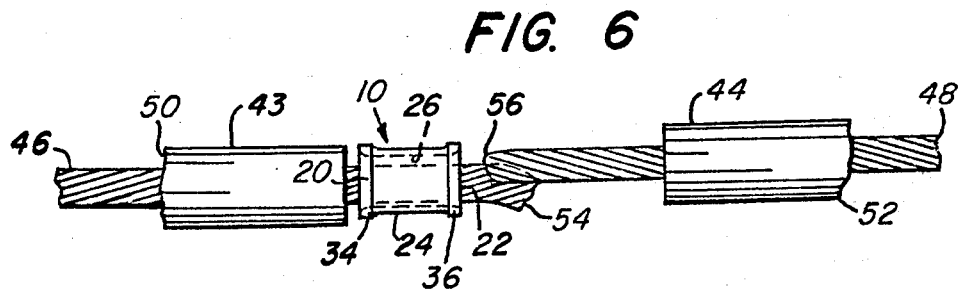

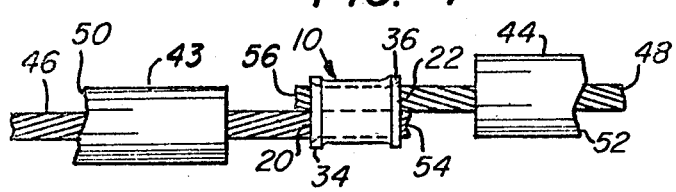
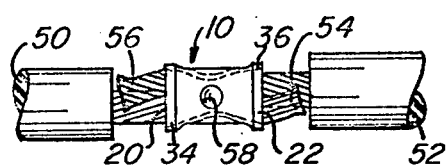
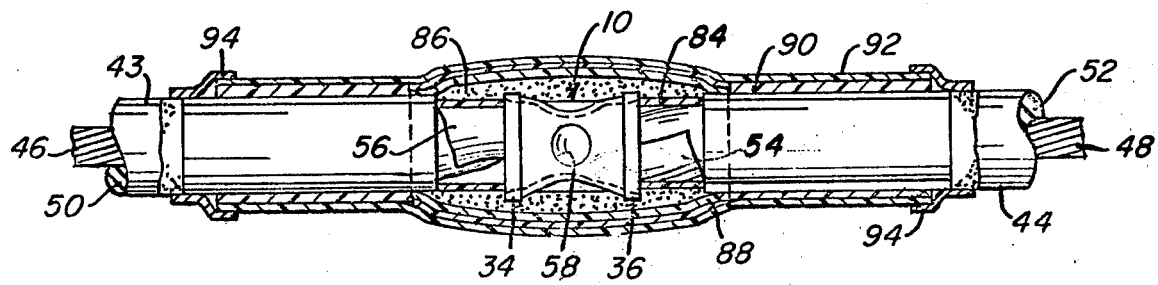
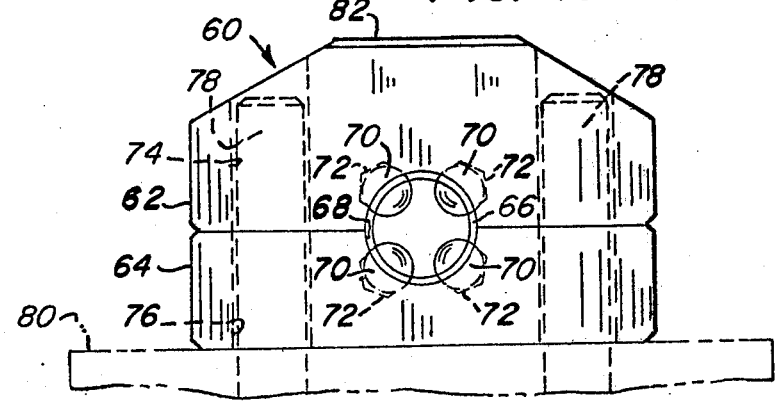
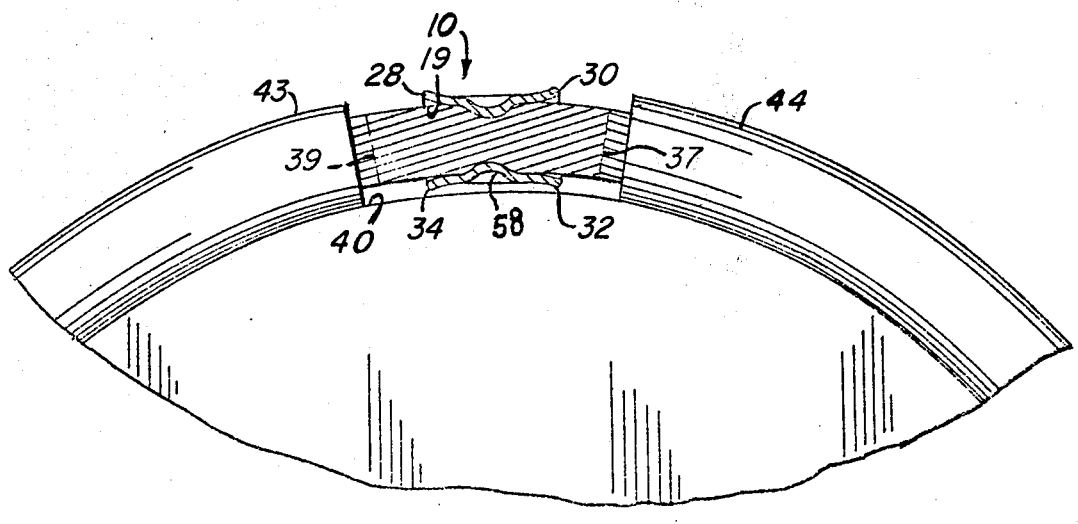

METHOD FOR MAKING A CABLE SPLICE JOINING A PAIR OF FLEXIBLE CONDUCTING CABLES

CROSS-REFERENCE TO RELATED APPLICATION

This is a division of application, Ser. No. 562,228 filed Mar. 26, 1975, entitled "Flexible Cable Splice", now Pat. No. 3,980,806, which in turn is a continuation-in-part of patent application, Ser. No. 179,445 filed on Sept. 10, 1971, now abandoned.

BACKGROUND OF THE INVENTION

1. Field of the Invention

This invention relates to a method for making a cable splice joining the broken end portions of a flexible electrical cable and more particularly a method for splicing together the broken end portions of a flexible cable that includes a formed metallic sleeve arranged to frictionally engage the joined cable end portions and permit optimum flexing of the cable without destroying the cable splice.

2. Description of the Prior Art

In underground mining substantially all of the equipment is electrically driven and the power is supplied by means of conductor cables. The conductor cables extend for substantially long distances and when connected to movable mining equipment are subjected to abrasion, moisture and frequent flexing, as for example, when the cable is wound on a cable reel and when the cable extends around pulleys mounted on the mining equipment. Adverse conditions to which the cable is subjected frequently result in a parting of the conductors and it is necessary to either splice or replace the cable before mining operations can resume. A splice, therefore, should be made with a minimum of tools at the location of the break in the cable and by one having ordinary skills with the tools.

When the broken cable is spliced in the field such as in a mine haulageway, the cable must meet minimum conditions in that it be moisture-resistant and retain flexibility to be wound on the cable reel without parting the splice. It is highly desirable to provide a splice that will part when the cable is subjected to a tensile strength up to but not in excess of the maximum safe tensile strength of the cable. The cable can then be respliced at the previous splice in a shorter period of time than is required to prepare a new splice. There are also regulations that limit the number of splices that can be made in the cable used in underground mining.

Conventional compression-type couplings for joining parted end portions of an electrical cable are well known in the art. The ends of the conductors are positioned in a tubular coupling, and the tubular coupling is crimped to secure the ends of the cable therein. The coupled cable is then provided with a moisture-resistant splice in which shrink-type tubings are positioned over the coupling at the splice, and heat is applied thereto to shrink the tubings as an outer jacket on the splice. Insulation may then be applied between the tubing and the metallic coupling.

The compression-type couplings frequently provide a greater tensile strength at the splice than the tensile strength of the conductor. Consequently, cable failure results at locations in the cable remote from the splice. Further, the compression-type couplings utilized in cable splices have a length which limits the travel of the splices over a pulley and the winding of the cable on a cable reel. This results in abrasion of the metallic conductor by the sharp end portions of the tube which restrain the spliced conductor from flexing. In addition, many tubular compression-type couplings have sharp peripheral edges that abrade or sever the insulation surrounding the cable splice upon flexing.

An example of a compression-type coupling is disclosed in U.S. Pat. No. 2,276,571 having a splice for joining together ends of electrical wires where the ends are inserted in a metal tube or sleeve that has flared end portions. After inserting the wire ends in the metal sleeve, the wires are twisted in opposite directions to effect intermingling of the strands of one wire with those of the other wire. The middle portion of the metal sleeve is then flattened by means of pliers whereby the sleeve and wires therein are compressed together to form a splice. Compressing the sleeve in this manner does not limit the degree of flattening imparted to the malleable tube so that the tensile strength in the splice is less than the tensile strength of the cable being spliced.

Intermingling of the strands of one wire with those of the other can allow stretching of the splice when the cable splice is under tension. Interweaving of the cable strands in this manner exerts a pull on only part of the copper strands initially and creates a stretching during use which ultimately destroys the insulating and watertight seal on the splice. Further, the elongated tube when flattened provides an inflexible splice that could not be wound about a pulley or a cable reel without the sharp end portions of the tube cutting into and severing the insulation and the strands of wire at the entry and exit of the wire at the ends of the tube. Tests have revealed that substantially all of the cable splice failures are attributed to the cutting off of the conductor strands by the sharp peripheral edges of the metallic sleeve on flexing of the cable.

Cable splices and connectors that frictionally engage the conductors and include flared end portions are illustrated in U.S. Pat. Nos. 3,120,023 and 3,612,748. The former discloses an end cap in which a plurality of cable end portions are positioned in a metallic cable member having a single flared end portion. The latter is directed to an explosive connector that positions a plurality of cable end portions within a cup-shaped connector that has an inner deformable shell and an outer rigid shell with an explosive positioned therebetween. The explosive is detonated to distort the inner shell to engage the cable end portions. However, connectors of this type have sharp edge portions that are urged into contact with the cable upon flexing thereby abrading the cable ultimately, resulting in cable failure. Furthermore, the elongated configuration of the connectors in relationship to the diameter substantially reduces the flexibility of the spliced cable causing abrasion of the cable by the inner edge of the connector as the cable passes around a pulley or cable reel.

U.S. Pat. Nos. 2,314,884 and 2,467,913 disclose splices for electrical conductors in which the parted end portions of the cables are either positioned in abutting relationship or in overlapping relationship with a metallic tube. A plurality of crimped indentations are formed on the periphery of the metal tube to thereby secure the cable end portions within the metallic tube. U.S. Pat. Nos. 3,258,522 and 3,387,364 disclose encapsulating a spliced electrical conductor with a rubber-like material such as vulcanized silicone rubber to insulate the conductor splice and protect the splice from the adverse effects of moisture, abrasion and the like.

There is need for a method of joining the broken end portions of a conducting cable by a metallic sleeve that preserves the cable splice adjacent the end portions of the sleeve by reducing abrasion by the sleeve as the spliced cable passes around a pulley or is wound on a cable reel and has a tensile strength up to but not in excess of the maximum safe tensile strength of the cable being spliced.

SUMMARY OF THE INVENTION

In accordance with the present invention there is provided a method for making a cable splice for joining a pair of flexible conducting cables that includes shaping the end portions of a metallic sleeve having a cylindrical body by cutting the sleeve body along a diagonal from adjacent the end portions. The inner cylindrical surface of the body adjacent the cut end portions is flared radially outwardly to form rounded end portions with the outer surface of the cylindrical body. Thus, the diagonal cut portion of the sleeve body is urged to a position parallel to the outer surface of the cylindrical body to form adjacent the sleeve end portions annular portions having flared inner surfaces and rounded end portions. The ends of the conducting cables having the insulation stripped therefrom exposing the conductors are inserted into opposite ends of the sleeve with the ends of the cables in overlapping relation. The sleeve is crimped to frictionally engage the ends of the cables in overlapping relation. Thereafter, the exposed ends of the cables and the sleeve are sealed to provide an electrically insulated and moisture and abrasion resistant cable splice.

The metallic sleeve comprises a copper sleeve having a longitudinal passageway therethrough with a diameter sufficient to receive a pair of overlapping cable end portions. Preferably, the copper sleeve has an inner cross sectional area of between about 0.040 and 0.050 square inch greater than the sum of the cross sectional areas of the cable end portions positioned therein for splicing. The shaped annular portions of the sleeve are formed by a first portion on the outer cylindrical surface of the sleeve extending diagonally from a point adjacent the sleeve end portion and terminating in a rounded portion at the sleeve end portion. With this arrangement, the end portion has a thickness less than the thickness of the body portion. A second portion of the shaped annular portion includes the inner cylindrical surface of the body portion flared outwardly adjacent the sleeve end portion such that the first portion is urged into alignment with the outer surface of the sleeve body portion.

In a specific embodiment of the present invention, the outer cylindrical surface of the shaped annular portion is positioned substantially parallel to the cylindrical body portion such that the outer cylindrical surface of the shaped annular portion and the cylindrical body portion form a planar end portion of the sleeve. A further embodiment of the present invention includes the shaped annular portion having the rounded end portion of a preselected radius of curvature and the planar surface of a preselected length positioned substantially parallel to the cylindrical body portion. The planar surface of the annular portion may be positioned beyond or within the outer cylindrical surface of the body portion, but in either position the planar surface is positioned substantially parallel to the sleeve body portion. With this arrangement, the sleeve end portions are removed from contact with the cable upon flexing of the cable thus preserving the cable splice by reducing the abrasion of the cable by the end portions of the sleeve.

With the cable end portions joined together within the metallic sleeve, a band of crimping indentations are positioned substantially intermediate the shaped annular treated portions of the sleeve. By deforming the sleeve body portion by forming the crimping indentations therein, the body portion frictionally engages the overlapped cable end portions in the longitudinal passageway of the sleeve with a frictional force that is less than the tensile strength of the cable being spliced. Preferably, the tensile strength of the spliced cable is about 85% of the maximum safe tensile strength of the cable being spliced. Thus, the spliced cable will part at the splice when subjected to tensile forces that approach the same tensile strength of the cable so that the cable can be more readily respliced at the previous splice rather than preparing new ends of the cable for splicing.

To protect the spliced cable from the adverse conditions to which it is subjected, an insulated watertight splice is formed and includes a first wrapping of a binding tape over the overlapping spliced cable end portions. A layer of an insulating putty is positioned around the cable splice. Then a plurality of layers of insulating tape are applied over the insulating putty and the first wrapping such that the cable splice is electrically insulated and sealed against the deleterious effects of fire, moisture and abrasion.

Accordingly, the principal object of the present invention is to provide a method for joining broken cable end portions of an electrical cable by a metallic sleeve having a cylindrical body portion with shaped annular portions positioned adjacent the sleeve end portions that serve to reduce abrasion to the conductor and the protective insulation surround the conductor as the cable splice is flexed.

A further object of the present invention is to provide an improved method for joining the parted end portions of an electrical cable with a deformable metallic sleeve having shaped annular portions that are spaced from contact with the cable end portions and have an inner curved surface that provides end clearance between the end portion of the sleeve and the cables therebeneath so that upon bending the cable the clearance between the cable and sleeve reduces the abrasion to the cable by the end portions of the sleeve.

Another object of the present invention is to provide a method for joining a pair of conducting cables that includes a metallic sleeve having a preselected length and diameter that permits optimum flexing of the spliced cable as it passes over cable pulleys and is wound on a cable reel without subjecting the cable to abrasion by the sleeve end portions.

A further object of the present invention is to provide an improved method for splicing the parted end portions of a flexible electrical cable so that the splice has a tensile strength up to but not in excess of the maximum safe tensile strength of the cable being spliced.

An additional object of the present invention is to provide a method for splicing the parted end portions of a flexible electrical cable that may be easily and efficiently installed in the field to provide a spliced cable having a preselected tensile strength and electrically insulated and protected from the effects of fire, moisture and abrasion.

These and other objects of the present invention will be more completely described in the following specification, the accompanying drawings and the appended claims.

BRIEF DESCRIPTION OF THE DRAWINGS

FIG. 1 is an enlarged sectional view in side elevation of a cylindrical metallic sleeve for joining a pair of conducting cables to form a flexible cable splice, illustrating the sharp end portions of the sleeve to be shaped in accordance with the present invention.

FIG. 2 is an enlarged sectional view in side elevation of the metallic sleeve, illustrating the first step of shaping the sleeve end portions.

FIG. 3 is an enlarged sectional view in side elevation of the metallic sleeve, illustrating the second step of shaping the sleeve end portions to provide annular portions having rounded end portions that reduce abrasion to the cable.

FIG. 4 is an enlarged sectional view in side elevation of the metallic sleeve, illustrating the metallic sleeve with the shaped annular portions extending beyond and positioned substantially parallel to the outer surface of the sleeve body portion.

FIG. 5 is a view similar to FIG. 4, illustrating the metallic sleeve with the annular portions positioned within and substantially parallel to the outer surface of the sleeve body portion.

FIG. 6 is a schematic representation of a pair of conducting cable end portions, each comprising bundles of individual copper strands with a portion of the jacket insulation removed therefrom, illustrating the cable end portions in overlapping relationship with one of the cable end portions having the metallic sleeve positioned thereon.

FIG. 7 is a schematic representation similar to FIG. 6, illustrating the metallic sleeve joining the cable end portions in overlapping relationship.

FIG. 8 is a schematic representation similar to FIG. 7, illustrating the metallic sleeve crimped into pressing contact with the overlapping cable end portions to join the cable end portions.

FIG. 9 is a view in side elevation, partially in section, of the cable end portions spliced together by the crimped metallic sleeve with the metallic sleeve and the exposed end portions of the cables sealed by an electrically insulated, moisture and flame resistant jacketing tape.

FIG. 10 is a view in side elevation of a splicing tool for forming the crimping indentations in the metallic sleeve.

FIG. 11 is a schematic view of an electrical conductor having cable end portions joined together by the metallic sleeve of the present invention, illustrating flexing of the spliced cable by the cable splice as the conductor is passed around a pulley.

DESCRIPTION OF THE PREFERRED EMBODIMENTS

Referring to the drawings and particularly to FIGS. 1-5, there is illustrated a deformable metallic sleeve generally designated by the numeral 10 for joining a pair of overlapping conducting cable end portions of a metallic conductor in accordance with the present invention. The metallic sleeve 10 comprises a continuous cylindrical copper body portion 12 of a preselected thickness forming a longitudinal passageway 14 therethrough with a diameter sufficient to receive a pair of overlapping cable end portions. Preferably, the length of the body portion 12 is about seven-eighths inch so as to insure a flexible cable splice as will be explained hereinafter in greater detail. According to the present invention, as illustrated in FIG. 3, the cylindrical body portion 12 is provided with shaped annular portions 16 and 18 positioned adjacent opposite end portions 20 and 22 of the sleeve 10. The annular portions 16 and 18 each includes an outwardly flared inner cylindrical surface 19 and an outer cylindrical surface 21 that form a rounded end portion 23 having a preselected radius of curvature. The outer surface 21 is positioned substantially parallel to outer cylindrical surface 24 of the sleeve 10, and as illustrated in FIG. 3, surface 21 is aligned with surface 24 to form planar end portions of the sleeve 10.

As illustrated in FIG. 1, prior to shaping the copper body portion 12 the sleeve 10 is fabricated from stock material having a uniform inside and outside diameter that defines opposite end portions 20 and 22. With this arrangement, the metallic sleeve 10 has a planar cylindrical outer surface 24 and an inner cylindrical surface 26 extending from end portion 20 to end portion 22. The end portions 20 and 22 terminate in sharp corners 25 that are shaped in accordance with the present invention to preserve the conductor and reduce abrasion to the insulation surrounding the cable splice.

Referring to FIG. 2, the corners 25 of sleeve end portions 20 and 22, illustrated in FIG. 1, are shaped by initially cutting or grinding the end portions to form a first portion of length L on the outer surface 24 extending diagonally from a point adjacent the sleeve end portion to a point between the inner surface 26 and the outer surface 24 at the sleeve end portion. The remaining portion between the outer and inner surfaces 24 and 26 is rounded to form a sleeve end portion having a preselected radius of curvature R. Preferably, the radius of curvature is between about 0.020 and 0.025 inch. The length L of the diagonal cut portion illustrated in FIG. 3 is determined by the thickness of the body portion 12 and preferably is cut on a 15° diagonal.

The sleeve 10 is further shaped, as illustrated in FIG. 3, by flaring the inner cylindrical surface 26 adjacent the end portions 20 and 22 of the body portion 12 radially outwardly at a preselected angle with a suitable flaring tool to form inner cylindrical surfaces 19 that intersect with the outer cylindrical surfaces 21 to form the rounded end portions 23. The inner cylindrical surfaces of the thus formed annular portions 16 and 18 are flared outwardly to the extend that the diagonal cut portion L illustrated in FIG. 2 is urged into alignment with the outer cylindrical surface 24 of the body portion 12. In this manner, the sharp peripheral edges 25 of the sleeve 10 illustrated in FIG. 1 are removed. The outer diameter of the opposite end portions 20 and 22 and outer surfaces 21 of the annular portions 16 and 18 are positioned substantially parallel to the sleeve outer surface 24.

In accordance with a specific embodiment of the present invention, a flexible cable splice comprising the metallic sleeve 10 with the body portion 12 of a thickness of about 0.090 inch, the annular portions 16 and 18 are shaped as illustrated in FIG. 3. With this arrangement, the outer surfaces 21 of the annular portions 16 and 18 are aligned with the outer surface 24 of the sleeve 10 to form a sleeve having planar end portions with flared inner surfaces 19 terminating in the rounded end portions 23.

Preferably, for sleeves having a body portion of a thickness less than 0.090 inch, annular portions 28 and 30 having rounded end portions 32 are shaped as illustrated in FIG. 4. The annular portions 28 and 30 include an outer cylindrical surface 34 of length L positioned parallel to the cylindrical surface 24. The annular portions 28 and 30 are formed by inserting a suitable flaring tool within the sleeve end portions 20 and 22 and exerting a radial force thereon until the diagonal cut portions are urged to a position parallel to the outer cylindrical surface 24 of the body portion 12. With this arrangement, the outer surfaces 34 of the annular portions 28 and 30 extend beyond the outer cylindrical surface 24.

Referring to FIG. 5, in accordance with the present invention, there is illustrated a further embodiment of the sleeve 10 having shaped annular end portions 31 and 33 with the outer cylindrical surfaces 34. The annular end portions 31 and 33 are formed as above described and include the outwardly flared inner cylindrical surfaces 19 that intersect with the planar outer cylindrical surfaces 34 to form the rounded end portions 32. However, in flaring the sleeve end portions 20 and 22, the diagonal portion of length L is urged to a position substantially parallel with the sleeve outer surface 24 but the planar surfaces 34 thus formed are positioned within the outer surface 24. This arrangement is preferred for a sleeve having a body portion of a thickness greater than 0.090 inch. Thus, for a sleeve having a body portion of a given thickness the flared annular end portions may be shaped in a preselected manner to insure a flexible cable splice. The sharp peripheral edges 25 illustrated in FIG. 1 are eliminated by shaping the sleeve end portions to provide flared annular portions of a desired configuration selected from the configurations illustrated in FIGS. 3–5. In this manner, the metallic sleeve 10 is operable to preserve the life of the cable splice by reducing the abrasion to the cable splice insulation and insuring optimum flexibility of the spliced cable.

With a metallic sleeve 10 having the shaped annular portions 28 and 30, a cable splice, as illustrated in FIG. 11, is provided with flared inner cylindrical surfaces 19 that are removed from contact with the overlapping cable end portiond 37 and 39 as the cable passes over a pulley 40. Furthermore, the outer planar surfaces 34 and the rounded end portions 32 of the annular portions 28 and 30 reduce abrasion to the insulation surrounding the sleeve upon flexing of the cable. In addition, the provision of the annular portions 28 and 30 with the flared inner surfaces 19 facilitates the positioning of the overlapping cable end portions in the sleeve 10. Thus, the flared inner surfaces 19 with the rounded end portions 32 eliminate the sharp peripheral edges of the sleeve and preserve the conductor by providing clearance at the sleeve end portions between the sleeve flares and the conductor when passing over a sheave. The shaped annular portion 28 and 30 formed in the above described manner, also provide for additional strength in the metallic sleeve 10 which helps to maintain the cylindrical shape of the sleeve end portions upon crimping.

Referring to FIG. 6, there is illustrated a pair of cable end portions 43 and 44 which have metallic conductors 46 and 48 enclosed or covered with insulation 50 and 52. The layer of insulation 50 and 52 is conventionally applied to the metallic conductor as a continuous layer and may be formed from various materials such as polyvinylchloride, neoprene or other rubber-like polymers.

In forming a cable splice according to the present invention, the ends of the cables 43 and 44 are trimmed to remove a section of the insulation to expose the conductors 46 and 48 and provide annular end portions 54 and 56 stripped of the insulation 50 and 52. One of the trimmed cable end portions such as end portion 54 is inserted into the metallic sleeve 10 as illustrated in FIG. 6. The inner diameter of the sleeve 10 is selected so that there is preferably an inner cross sectional area of between about 0.040 and 0.050 square inch greater than the sum of the cross sectional areas of the cable end portions 54 and 56 positioned therein. A clearance area of this size is sufficiently large to easily insert the pair of conductors and, as described hereinafter, permit crimping or compression of the flared sleeve 10 to properly engage the cable end portions. Also, the inner diameter of the sleeve 10 is preferably selected for different sizes of cable to provide this clearance area of 0.040 and 0.050 square inch to get a common clearance area in the sleeves used for different sized cables. As stated above, the sleeve 10 preferably has a length of seven-eighths inch which is sufficient to receive the cable end portions 54 and 56 in overlapping relationship and permit flexing of the spliced conductors within the sleeve as the cable is wound upon a cable reel and/or guide sheaves. It is the provision of the shaped annular portions 34 and 36 that insures a flexible cable splice with reduced abrasion to the insulation surrounding the sleeve.

To permit ease of entry of the cable end portion 54 into the longitudinal passageway 14 of sleeve 10, the end portion 54 is preferably flat. The sleeve 10 is then advanced along the exposed cable end portion 54 until the sleeve end portion 20 reaches a position adjacent the insulation 50 on the conductor 46. Thereafter, the sleeve 10 is advanced on the cable end portion 54 toward the cable end portion 56, making certain that the cable end portion 54 remains within the passageway 14, and the cable end portion 56 is guided into the sleeve end portion 22. By twisting the sleeve and pushing both cable end portions 54 and 56 through the passageway 14, the sleeve 10 is advanced to the position illustrated in FIG. 7.

As illustrated in FIG. 7, the cable end portions 54 and 56 extend in overlapping relationship through sleeve end portions 20 and 22, respectively. The cable end portions 54 and 56 are further pushed through the sleeve 10 until the end portions are positioned in substantially abutting relationship with the insulation 50 and 52 of the respective conductors 46 and 48, as illustrated in FIG. 8. Then the free end portions 54 and 56 extending through the sleeve 10 are pressed around the mating cable to surround the mating cable in approximately a 180° relationship. With this arrangement, the metallic sleeve 10 joining the cable end portions is ready for crimping and sealing with tape and insulation.

A plurality of crimping indentations 58 illustrated in FIG. 8 are formed in the sleeve 10 by a cable splicing tool generally designated by the numeral 60 in FIG. 10. The cable splicing tool forms a band of the crimping indentations 58 around the periphery of the center portion of the sleeve 10 in the same transverse plane through the sleeve 10.

The cable splicing tool 60 illustrated in FIG. 10 includes a pair of opposed guide housings 62 and 64 adapted to be fitted together in abutting relationship. Each of the opposed die housings 62 and 64 includes a semicircular die 66 and 68 respectively. Dies 66 and 68 extend longitudinally of their respective die housing. With this arrangement, the opposed die housings 62 and 64 fit together in abutting relationship to form a channel-shaped printing die extending longitudinally through the abutting die housing.

Each semicircular die 66 and 68 includes a pendant arrangement projecting radially inwardly thereof. As illustrated in FIG. 10, the pendant arrangement comprises ball bearings 70. Ball bearings 70 are seated and maintained in position with the semicircular dies 66 and 68 and respective seats 72 formed therein. Each of the seats 72 comprises a bore formed, as by drilling, in die housings 62 and 64. Each of the seats 72 is located along a circle of a vertical section through the channel-shaped die formed by the semicircular dies 66 and 68. Each of the seats 72 is drilled to a preselected depth within a die housing. A desired portion of the ball bearing 70 extends through the wall of a semicircular die for forming the pendant arrangement that projects radially inwardly thereof. The ball bearings 70 are held in place in the die housing seats 72 by the center punch indentations made in the semicircular dies 66 and 68 at two points adjacent each of the seats 72.

To form the cable splice according to the present invention, the cable end portions 54 and 56 joined together by the metallic sleeve 10 are inserted in semicircular die 68 of die housing 64. Thereafter, the housing 62 is placed atop the cables within the die as illustrated in FIG. 10. With this arrangement, the ball bearing pendant arrangements 70 are located along a circle taking the vertical section above described. To insure proper alignment of the semicircular die cavities, each of the die housing 62 and 64 is provided with a pair of bores 74 and 76. The bore pairs 74 and 76 are vertically aligned to receive the dowel pins 78 that prevent sliding or slipping of the die housings 62 and 64. With this arrangement, the ball bearings 70 are maintained in proper position. The dowel pins 78 are vertically supported by a base plate 80.

After opposed die housings 62 and 64 have been properly aligned with the pair of cable end portions 54 and 56 retained in the metallic sleeve 10, a crimped splice may be formed. To complete the crimped splice, a force is exerted on the closed die housing 62 and 64 to urge the housings toward abutting relationship and to compress the ball bearings 70 into the sleeve 10 having the overlapping end portions 54 and 56 positioned therein. In this manner, a crimped cable splice is formed having a band of crimping indentations 58 formed around the periphery of the sleeve 10 in the same transverse plane therethrough. The striking force required to crimp the sleeve cables 54 and 56 is applied to a striking surface 82 that projects upwardly from the die housing 62. By striking the surface 82 with a suitable tool, such as a hammer, a force is exerted on the opposed die housings 62 and 64 urging them toward each other.

In accordance with the practice of the present invention, the crimped splice, as illustrated in FIG. 8, is formed by exerting a few striking forces upon the surface 82 to make initial crimping indentations 58 in the periphery of the sleeve 10 and joining in overlapping relationship the cable end portions 54 and 56. Thereafter, the cable splice is rotated within the die until the initial crimping indentations are aligned in the same transverse plane of the next adjacent ball bearings 70. Striking surface 82 is then again struck with a hammer. The cable is once again rotated and a striking force applied to surface 82 until die housing 62 "bottoms out" on die housing 64. With this arrangement, the die housings are positioned in abutting relationship.

By providing a die which bottoms out the degree of crimping and the strength of the cable splice is exactly controlled. It is, therefore, not possible to overcrimp a cable splice. Furthermore, by providing the sleeve 10 with the above described shaped annular portions, the cylindrical shape of the end portions of the sleeve is maintained upon crimping.

As illustrated in FIGS. 9 and 11, the crimping indentations 58 formed in the sleeve 10 have a spherical configuration with a radius of curvature equal to that of the ball bearings 70. The spherical crimping indentations 58 substantially and uniformly reduce the stress concentrations applied to the conductor at the crimp location. As compared to square crimping indentations having sharp corners with high stress concentrations, the spherical indentations 58 eliminate sharp crimp corners. Thus, elimination of sharp crimp corners and the accompanying high stress concentrations substantially reduces cable failure associated therewith, particularly upon flexing of the cable at the splice.

The cable splice formed by the present invention has a maximum safe tension up to but not in excess of the maximum safe tensile strength of the cable being spliced. It is preferred that the cable splice have a tensile strength of about 85% of the maximum safe tensile strength of the cable being spliced. Further in accordance with the present invention, the above described cable splice can readily be accomplished in the field. The only tools required for forming the splice are the cable splicing tool 60 and a hammer of the like. Thus, the broken cable may be rapidly and efficiently spliced and returned to service.

Further, with this type of splice the cable will part at the splice when subjected to tensile forces that approach the safe tensile strength of the cable so that the cable can be more readily respliced at the previous splice rather than preparing other parted ends of the cable for splicing.

After the cable end portions 54 and 56 are frictionally engaged by crimping the sleeve 10 in the above described manner, the exposed ends of the cable are wrapped with three to four wraps of a strong compressive tape 84, such as a glass cloth tape or plastic electrician's tape, as illustrated in FIG. 9. An insulating putty 86 is spread over the entire spliced area between the insulating materials 50 and 52 on the cables 54 and 56. Sufficient insulating putty 86 is applied to the sleeve and spliced area to completely fill the uninsulated area to a diameter equal to or slightly larger than the outside diameter of the insulation 50 and 52. A suitable insulating filler putty is sold by the Okonite Company, Ramsey, N.J. under the trade name Okonite Filler Putty, No. 602758010. A layer of insulating material 88 may be placed over the puttied spliced area. Preferably, the insulating material 88 comprises a fabric-like tape.

The surface of insulations 50 and 52 on the conductors 46 and 48 is roughened for a length of several inches of the cable splice. A suitable liquid cement is applied to the entire roughened section and to the fiberglass tape 88. The splicing cement preferably comprises a neoprene splicing cement. The entire cement-coated area is then covered with a thin layer of an insulating putty 90 of the same material as the insulating putty 86. A final outer layer of insulating tape 92 is applied lengthwise of the splice for additional sealing and insulating purposes. A suitable insulating tape 92 is available under the trade name "Okonite No. 35 Red Jacket" manufactured by the Okonite Company, in Ramsey, N.J.

An end cap 94 for the insulation and sealing materials is provided and may comprise a several layered wrap of an insulating tape such as the above mentioned insulating tape 92. Thus, it will be apparent from the above described splice that a broken cable can be quickly and efficiently spliced in the field to provide a flexible cable splice that is electrically insulated and has moisture and abrasion resistant properties that permit full operation of the spliced conductor under adverse conditions and repeated flexing without destroying of the cable splice.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. Method for making a cable splice joining a pair of flexible conducting cables comprising,
    shaping the end portions of a metallic sleeve having a cylindrical body by cutting said sleeve body along a diagonal from adjacent said end portions,
    flaring the inner cylindrical surface of said body adjacent said cut end portions radially outwardly to form rounded end portions with the outer surface of said cylindrical body,
    urging said diagonal cut portion of said sleeve body to a position parallel to the outer surface of said cylindrical body to form adjacent said sleeve end portions annular portions having flared inner surfaces and rounded end portions,
    inserting the ends of the conducting cables having the insulation stripped therefrom and the conductors exposed into opposite ends of said sleeve with the ends of the cables in overlapping relation,
    crimping said sleeve to frictionally engage the ends of the cables in overlapping relation, and
    sealing the exposed ends of the cables and said sleeve to provide an electrically insulated and moisture and abrasion resistant cable splice.

2. The method for making a cable splice joining a pair of flexible conducting cables as set forth in claim 1 which includes,
    urging said diagonal cut portion of said sleeve body to a position in alignment with the outer surface of said cylindrical body to form a sleeve having planar end portions with flared inner surfaces terminating in rounded end portions.

3. The method for making a cable splice joining a pair of flexible conducting cables as set forth in claim 1 which includes,
    exerting a radial force upon said diagonal cut portion of said sleeve body to urge said diagonal cut portion to a position parallel to and extending beyond the outer surface of said cylindrical body and thereby form shaped annular portions adjacent said sleeve end portions.

4. The method for making a cable splice joining a pair of flexible conducting cables as set forth in claim 1 which includes,
    exerting a radial force upon said diagonal cut portion of said sleeve body to urge said diagonal cut portion to a position parallel to and extending within the outer surface of said cylindrical body and thereby form shaped annular portions adjacent said sleeve end portions.

5. The method for making a cable splice joining a pair of flexible conducting cables as set forth in claim 1 which includes,
    shaping said sleeve end portions by cutting said end portions to form a cut portion of a preselected length extending diagonally from a point adjacent said sleeve end portions to a position between the inner and outer surface of said cylindrical body at said sleeve end portions, and
    rounding said sleeve end portions between the inner and outer surface of said cylindrical body to form sleeve end portions having a preselected radius of curvature.

6. The method for making a cable splice joining a pair of flexible conducting cables as set forth in claim 1 which includes,
    cutting said cylindrical body adjacent said sleeve end portions at an angle of 15° extending diagonally from a point adjacent said sleeve end portions to a position between the inner and outer surfaces of said sleeve end portions.

7. The method for making a cable splice joining a pair of flexible conducting cables as set forth in claim 1 which includes,
    flaring the inner cylindrical surface of said body portion adjacent said cut portions radially outwardly at a preselected angle to form an inner cylindrical surface intersecting the outer surface of said cylindrical body to form a sleeve having rounded end portions.

8. The method for making a cable splice for joining a pair of flexible conducting cables as set forth in claim 1 which includes,
    wrapping the exposed ends of said conductors between said sleeve and the insulation remaining on said conductors with a compressive tape,
    applying an insulating putty to said sleeve and the wrapped ends of said conductors to a diameter slightly larger than the diameter of the insulation on said conductors,
    wrapping a first layer of insulating tape around the insulation on said conductors and said putty surrounding said sleeve and wrapped ends of said conductors,
    roughing a section of the surface of the insulation on said conductors adjacent said sleeve,
    applying a liquid cement to the roughened section and to said insulating tape,
    wrapping the cemented area with a second layer of insulating tape, and
    sealing the end portions of said layer of insulating tape with a third layer of insulating tape to provide an electrically insulated and moisture and abrasion resistant flexible cable splice.

* * * * *